United States Patent [19]
Mumford

[11] Patent Number: 5,694,279
[45] Date of Patent: Dec. 2, 1997

[54] SUPERCONDUCTIVE FAULT CURRENT LIMITERS

[75] Inventor: Francis James Mumford, Weston, United Kingdom

[73] Assignee: GEC Alsthom Limited, United Kingdom

[21] Appl. No.: 584,735

[22] Filed: Jan. 11, 1996

[30] Foreign Application Priority Data

Jan. 28, 1995 [GB] United Kingdom ............... 9501717

[51] Int. Cl.[6] .................................................. H02H 7/00
[52] U.S. Cl. ................................................... 361/19; 361/10
[58] Field of Search ............................ 361/10, 11, 19, 361/57, 58, 141; 336/DIG. 1; 335/216, 299, 300; 505/211, 212, 238, 239, 850, 879, 885; 174/125.1

[56] References Cited

U.S. PATENT DOCUMENTS

| | | | |
|---|---|---|---|
| 4,384,265 | 5/1983 | Shimamoto et al. | 335/216 |
| 4,431,980 | 2/1984 | Ikegawa et al. | 336/DIG. 1 |
| 5,140,290 | 8/1992 | Dersch | 336/DIG. 1 |
| 5,173,678 | 12/1992 | Bellows et al. | 335/216 |
| 5,241,447 | 8/1993 | Barber et al. | 361/19 |
| 5,546,261 | 8/1996 | Yoshida et al. | 361/19 |

FOREIGN PATENT DOCUMENTS

| | | | |
|---|---|---|---|
| 0 353 449 A1 | 6/1989 | European Pat. Off. | H01F 5/08 |
| 59-058803 | 4/1984 | Japan | H01F 5/08 |
| 63-119507 | 5/1988 | Japan | H01F 5/08 |
| 1015561 | 1/1966 | United Kingdom | H01F 5/00 |
| 1084529 | 9/1967 | United Kingdom | H01F 5/00 |
| 1101298 | 1/1968 | United Kingdom | H01B 5/18 |

OTHER PUBLICATIONS

*A Magnetic Shielding Type Superconducting Fault Current Limiter using a Bi2212 Thick Film, Cylinder*, Ichikawa & Okazaki, IEEE Transactions on Applied Superconductivity, vol. 5, No. 2, Jun. 1995.

*Current Limiting Reactor Based on High-Tc Superconductors*, IEEE Transactions on Magnetics, vol. 27, No. 2, Mar. 1991.

*Primary Examiner*—Jeffrey A. Gaffin
*Assistant Examiner*—Ronald W. Leja
*Attorney, Agent, or Firm*—Kirschstein, et al.

[57] ABSTRACT

An inductive Superconductive Fault-Current Limiter (SCFCL) includes an iron core having a wound primary winding and a short-circuited superconductive secondary. The secondary remains superconductive up to a fault-current level in the primary, after which the superconductive secondary becomes resistive, the primary ampere-turns are not balanced, and the device becomes highly inductive, so limiting the fault-current. The fault-current threshold is increased without exceeding available critical superconductive current density levels and with a moderate superconductive coating thickness by using a stack of superconductive coated washers having a large radial extent compared to the coating thickness.

12 Claims, 2 Drawing Sheets

Fig.1.
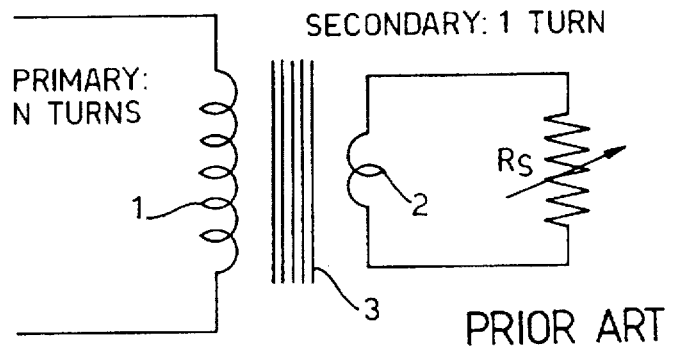
PRIOR ART
Fig.2(a).
Fig.2(b).
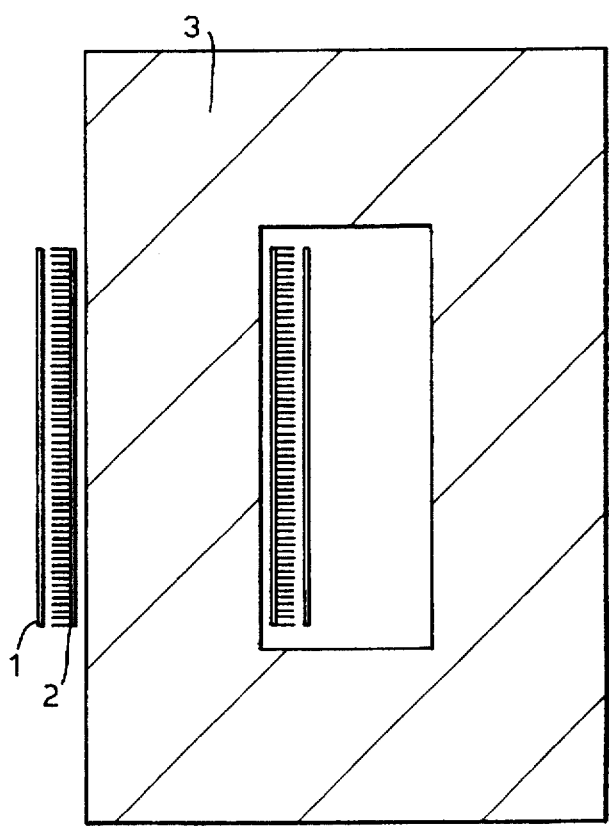
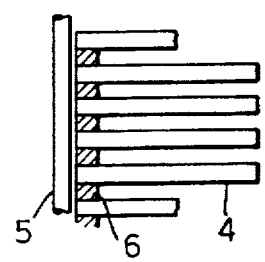
Fig.3(b).  Fig.3(a).
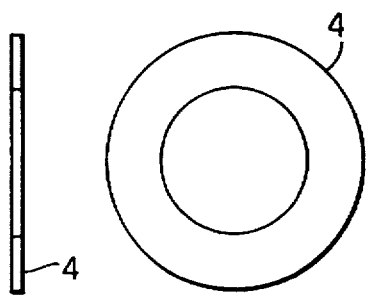

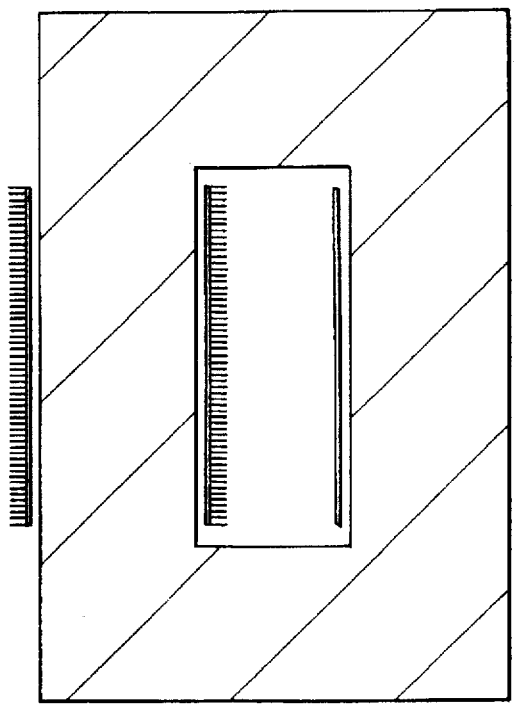
Fig.4.
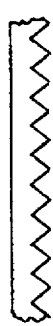 
Fig.5(a)   Fig.5(b)

SUPERCONDUCTIVE FAULT CURRENT LIMITERS

BACKGROUND OF THE INVENTION

This invention relates to superconductive fault-current limiters (SCFCL).

Referring to FIG. 1 of the accompanying drawings, an inductive SCFCL may be represented by a primary winding 1 and shored secondary winding 2 wound around an iron (or air) core 3. The shorted winding is a layer or cylinder of superconductor material and the primary winding forms pan of a circuit which is to be protected against fault currents. During normal operation flux, due to induced current in the superconductor, effectively shields (or cancels) the magnetic flux of the primary winding from the iron core and a low inductance is presented by the SCFCL to the circuit. However, when the current density in the superconductor rises above a critical value the superconductor becomes resistive and the induced superconductor current fails to produce a sufficient, balancing flux. There is then a net unshielded/unbalanced primary flux which enters the iron thereby giving rise to a large inductive reactance which self limits the fault current.

With a superconductive winding of given critical current density ($J_c$) and given cross-section, a critical primary current is determined—the fault current—above which value self limiting takes place.

The resistance $R_S$ in the secondary circuit of FIG. 1 represents the superconductor resistance that arises when the primary current exceeds the fault current.

A superconductive fault-current limiter of the inductive type, using so-called high temperature superconductor (HTS), is known, for example from European Patent No. 0353449.

A problem that arises in prior art devices such as mentioned above as that the fault current that can be accommodated is unduly limited by the cross sectional area of the superconductive flow path. An attempt to increase the fault current threshold by increasing the thickness of the secondary cylinder (and thus the cross section or the flow path) in the prior an device is unsatisfactory because the critical current density of the superconductor ($J_C$) deteriorates as the thickness increases. In addition, a thin layer of HTS is desirable to ensure short switching times and to ensure that temperature rise during fault conditions remains controllable without the need to activate circuit breakers in the circuit being protected.

It is an object of the present invention to provide a superconductive fault-current limiter which largely overcomes the above problems of the pt/or arc.

SUMMARY OF THE INVENTION

According to the invention, in a superconductive fault-current limiter comprising a primary fault-current winding, a secondary winding in the form of a superconductive cylinder, and a ferromagnetic circuit threading both primary and secondary windings, the primary and secondary windings being arranged to produce substantial cancellation of primary flux in the ferromagnetic circuit in the superconducting condition of the secondary winding, the superconductive cylinder comprises a substrate coated with superconductive tutorial, the substrate being of such form that at least sections of the superconductive coating extend laterally relative to the axis of the cylinder.

At least some of said sections may be exposed surfaces permitting cooling fluid to contact the superconductive coating.

The substrate may comprise a stack of individual washer-like components coated with superconductive material on one or both faces. The washer-like components may be interleaved with spacing members to permit cooling fluid to contact the superconductive coatings.

Alternatively, the substrate may be a cylinder having a grooved outer surface.

In another embodiment the substrate may be of substantially uniform thickness and of corrugated form.

The superconductive cylinder and the primary winding may be disposed at the same location on the ferromagnetic circuit and the superconductive cylinder lie within the primary winding.

BRIEF DESCRIPTION OF THE DRAWINGS

A superconductive fault-current limiter in accordance with the invention will now be described, by way of example, with reference to the accompanying drawings, of which:

FIG. 1 is a circuit diagram of a genetic SCFCL according to the prior art;

FIG. 2(a) is a sectional diagram of an SCFCL according to the invention;

FIG. 2(b) is an enlarged detail of the superconductive cylinder of FIG. 2(a);

FIGS. 3(a) and 3(b) are plan and side elevation views of a component "washer" of the superconductive cylinder of FIG. 2(b);

FIG. 4 is a view analogous to FIG. 2(a) showing the primary and secondary at different locations around the core;

FIG. 5(a) shows a modified substrate having a grooved outer surface; and

FIG. 5(b) shows another modified substrate having a corrugated outer surface.

DETAILED DESCRIPTION OF EMBODIMENTS OF THE INVENTION

Referring to FIG. 1, a primary winding 1 is connected in series in a circuit to be protected. The winding 1 embraces a ferromagnetic core 3 which is also coupled to a superconductive winding 2 constituting a short circuited secondary. The resistance of the secondary winding is represented by a variable resistor $R_s$, the value depending upon the superconductive state. This in turn depends upon the current density, being superconductive below a critical value $J_c$ and resistive above that value. In the superconducting state at normal current values, the current induced in the superconductive cylinder is such that the ampere-turns are equal and opposite to that of the primary winding.

The two windings may then be considered an combination to produce a net zero field intensity and consequently a net zero flux in the iron core.

Alternatively it may be considered that the superconductive cylinder 2 acts as a screen to prevent the primary flux from 'seeing' the iron core. The primary inductance is thus very low and there is negligible impedance presented to the protected circuit.

The secondary current rises with the primary current until the critical current, $I_C$ for the superconducting screen is exceeded. At this point, which is arranged to define the onset of a fault condition in the primary circuit, the secondary becomes resistive (i.e. $R_S$ increases from zero), the two magnetic intensities go out of balance, a net flux enters the iron core, the primary winding inductance increases greatly and the resulting increased impedance limits the fault current.

Referring to FIG. 2(a), this shows a rectangular soft iron core 3 one limb of which is embraced by a primary copper winding 1 and a superconductive cylinder 2 constituting a short-circuited secondary winding.

The cylinder 2 is only broadly of cylindrical form and consists of a ceramic tube of zirconia (shown enlarged in FIG. 2(b)) fitted with washer-like pieces 4, see FIG. 3(a) and 3(b) of zirconia, the latter being coated on one or both sides with a high temperature superconductor. At the present time several HTS materials are available having a critical temperature above 77° K.

The washers 4 are spaced apart by circular spacers 6 also of ceramic.

The coating thickness is in the range 50–100 μm and is limited to 100 μm to avoid deterioration of $J_c$. The radial extent of the coated surface of the washer may be of the order of 50–100 times the coating thickness.

In principle the spacers may be of similar size and shape to the coated washers so as to produce, in effect a solid, thick walled, ceramic cylinder having periodic superconductive annular sections. However, to maintain the superconductivity up to the design fault current threshold it is essential that the temperature be kept below the critical temperature.

The use of small diameter spacers provides access to the superconductive coatings for a cooling fluid, for example [liquid nitrogen], and so enhances the current carrying capacity considerably.

In the arrangement using spaced washers with superconductive coatings, leakage flux may escape between the annular sections so permitting a degree of coupling between primary flux and the iron core. This can be overcome by controlling the spacing between washers and/or by coating the tubular substrate (5) itself with a thick film of superconductive material. No gaps would then be available for the escape of leakage flux.

In FIG. 2 the superconducting cylinder 2 is shown between the copper winding 1 and the iron core 3.

This arrangement is preferable so as to gain the benefit of the screening effect, enhanced as necessary by coating the tubular substrate 5.

By locating the primary winding 1 immediately adjacent to the iron core it is clear that in this embodiment the superconductive cylinder provides no screen effect but in combination with the primary copper winding produces a net zero external flux. There can however be a degree of flux leakage from the primary winding which will couple with the adjacent iron core despite the balancing superconductive winding.

In some circumstances, where flux can be constrained to the iron corn, the primary and secondary 'windings' may be displaced around the magnetic circuit so that they embrace different limbs of the core, as shown in FIG. 4. In general however, superior results have been obtained where the windings are located together, and with the superconductive winding inside the copper winding.

It will be apparent that the increased cross section of the secondary current flow path can be obtained by the use of superconductive coatings of form different from that used in the washer arrangement. Thus the surface of the ceramic cylinder could be given a serpentine or zig-zag contour in the plane of FIG. 2(b) by cutting V-grooves in the surface, as shown in FIG. 5(a). Again, if a thin-walled ceramic cylinder could be moulded with corrugations of circular or other section and the corrugated surface coated with superconductive material on one or both sides, as shown in FIG. 5(b) this would achieve the increased cross section and at the same time permit efficient cooling.

In a further alternative the superconductive material could be coated on to a corrugated metallic cylinder if the metallic cylinder were of high enough resistance.

The described embodiments effectively increase the superconductive coating cross section by increasing its length (within the same overall length dimension) without increasing its thickness.

Considering now the theory of the above construction, the design criterion for shielding flux density $B_p$ is that the total amp turns per meter in the superconductor are equal and opposite to the amp turns per meter in the primary windings. When $B_p$ is exceeded part or all of the flux enters the iron core.

The maximum flux density shielded by the superconductor is given by:

$B_p = \mu_o J_c t$ (T)

where $\mu_o = 4\pi \times 10^{-7}$ (Hm$^{-1}$)

$J_c$=critical current density of the superconductor (Am$^{-2}$)

t=thickness of superconducting layer (m)

It is seen that the product $J_c t$ (Amp m$^{-1}$) controls the level of shielding and furthermore, $B_p$ is also a controlling factor in the determination of the iron core volume, $V_I$ required to produce a specific inductance.

$$V_I = \frac{2\mu_o I_F V_F}{\omega B_S B_P} \quad (m^3)$$

where $I_F$=fault current in the primary winding (A)

$V_F$=voltage across SCFCL during a fault (V)

$B_s$=flux density in the iron core (T)

$\omega = 2\pi \times$frequency (rad)

$B_p$ and hence $J_c t$ should be large for small $V_I$.

The present status of HTS coated on to substrate material is that the $J_c$ value deteriorates as the thickness of the layer is increased. In addition, a thin layer of HTS is required to ensure short switching times and also to ensure that temperature rise during fault conditions remains controllable without the need to activate a protective circuit-breaker in order to prevent burn-out, A desirable $J_c t$ value of $2\times 10^4$ Am$^{-1}$ or more is required for a film thickness of 50–100 μm. Consequently, $J_c$'S of $5\times 10^9 1 \times 10$ Am$^{-2}$ are sought. At present $J_c$ values of this magnitude in HTS material at 77K are only possible for thin films (<1 μm).

The invention provides a method by which the desired product, $J_c t$ can be effectively achieved whilst at the same time preserving the requirement for a film thickness≦100 μm.

The significance of the FIG. 2 configuration of superconductor on substrate is that the 'effective thickness', t of superconductor now approximates to the annular width of The washer. Hence the required product $J_c t$ can be achieved for relatively low $J_c$ material by making the annular section wider. Furthermore, the true thickness of the superconducting layer can be maintained below the 100 μm required for cooling and switching purposes.

Additional benefits accrue from this 'washer' design in regard to manufacture. Large scale manufacture of the thick film superconductor on substrate could be simplified in terms of deposition and furnace requirements.

Fabricating an inductive SCFCL with a stack of annular shaped substrate material with a thick HTS film is seen to provide adequate shielding of the magnetic flux even when $J_c$ is modest. Even with todays state-of-the-art, current densities obtainable ($<10^7$ $Am^{-2}$ for thick films) make it potentially possible now to manufacture a large SCFCL.

The design described above with relation to FIG. 2(b) employs direct cooling by the circulation of a liquid gas between the washers 4. In an alternative method a cold gas cryocooler is employed. In this method a heat shunt is placed in close contact with the washer to be cooled and the end of the hut shunt remote from the washer is cooled by a cola gas—helium for example. The heat shunt may be in the form of a washer acting as a spacer between the superconductor coated washers 4. This heat shunt preferably extends radially beyond the washers 4 to provide good access for the coolant gas. Suitable materials for the heat shunt are alumina, ruby or diamond which all have good thermal conductivity and poor electrical conductivity.

I claim:

1. A superconductive fault-current limiter, comprising: a primary fault-current winding, a secondary winding in the form of a superconductive cylinder having an axis, and a ferromagnetic circuit threading both primary and secondary windings, the primary and secondary windings being arranged to produce substantial cancellation of primary flux in the ferromagnetic circuit in the superconducting condition of the secondary winding, wherein the superconductive cylinder comprises a substrate coated with superconductive material, the substrate being of such form that at least sections of the superconductive coating extend laterally relative to the axis of the cylinder, said laterally extending sections forming short-circuit current paths around said cylinder axis.

2. A fault-current limiter according to claim 1, wherein at least some of said sections are exposed surfaces permitting cooling fluid to contact the superconductive coating.

3. A fault-current limiter according to claim 1, wherein the substrate comprises a stack of individual washer-like components coated with superconductive material on one or both faces.

4. A fault-current limiter according to claim 3, wherein said washer-like components are interleaved with spacing members to permit cooling fluid to contact the superconductive coatings.

5. A fault-current limiter according to claim 3, wherein said washer-like components are interleaved with spacing members of them fly conducting and electrically insulating material, said spacing members extending into a cooling fluid.

6. A fault-current limiter according to claim 1, wherein said substrate is zirconia.

7. A fault-current limiter according to claim 1, wherein said substrate is a cylinder having a grooved outer surface.

8. A fault-current limiter according to claim 1, wherein said substrate is of substantially uniform thickless and of corrugated form.

9. A fault-current limiter according to claim 1, wherein the superconductive cylinder and the primary winding are disposed at the same location on the ferromagnetic circuit.

10. A fault-current limiter according to claim 9, wherein the superconductive cylinder lies within the primary winding.

11. A fault-current limiter according to claim 1, wherein the superconductive cylinder and the primary winding are disposed at different parts of the ferromagnetic circuit.

12. A superconductive fault-current limiter, comprising: a primary fault-current winding, a secondary winding in the form of a superconductive cylinder, and a ferromagnetic circuit threading both primary and secondary windings, the primary and secondary windings being arranged to produce substantial cancellation of primary flux in the ferromagnetic circuit in the superconducting condition of the secondary winding, wherein the superconductive cylinder comprises a tubular substrate coated with superconductive material, said substrate comprising a stack of individual washer-like components coated with superconductive material on one or both faces and mounted on said tubular substrate.

* * * * *